(12) United States Patent  (10) Patent No.: US 9,215,475 B2
Tourapis et al.  (45) Date of Patent: Dec. 15, 2015

(54) METHOD AND APPARATUS FOR MOTION ESTIMATION USING COMBINED REFERENCE BI-PREDICTION

(75) Inventors: Alexandros Tourapis, Burbank, CA (US); Jill MacDonald Boyce, Manalapan, NJ (US); Peng Yin, West Windsor, NJ (US)

(73) Assignee: THOMSON LICENSING, Boulogne-Billancourt (FR)

(*) Notice: Subject to any disclaimer, the term of this patent is extended or adjusted under 35 U.S.C. 154(b) by 1824 days.

(21) Appl. No.: 12/223,413

(22) PCT Filed: Jan. 30, 2007

(86) PCT No.: PCT/US2007/002381
§ 371 (c)(1),
(2), (4) Date: Jul. 30, 2008

(87) PCT Pub. No.: WO2007/092192
PCT Pub. Date: Aug. 16, 2007

(65) Prior Publication Data
US 2009/0067505 A1    Mar. 12, 2009

Related U.S. Application Data

(60) Provisional application No. 60/764,452, filed on Feb. 2, 2006.

(51) Int. Cl.
*H04N 7/12* (2006.01)
*H04N 19/577* (2014.01)
(Continued)

(52) U.S. Cl.
CPC ............... *H04N 19/577* (2014.11); *H04N 1/56* (2014.11); *H04N 19/573* (2014.11); *H04N 19/58* (2014.11); *H04N 19/517* (2014.11); *H04N 19/533* (2014.11)

(58) Field of Classification Search
CPC ... H04N 19/517; H04N 19/533; H04N 19/56; H04N 19/573; H04N 19/577; H04N 19/58
USPC ............................................... 375/240.01–29
IPC ......................................................... H04N 7/12
See application file for complete search history.

(56) References Cited

U.S. PATENT DOCUMENTS 5,619,268 A * 4/1997 Kobayashi et al. ...... 375/240.15
6,807,231 B1 * 10/2004 Wiegand et al. ......... 375/240.12
(Continued)

FOREIGN PATENT DOCUMENTS

WO    WO2004054225    6/2004

OTHER PUBLICATIONS

Boyce, "Adaptive reference picture weighting using reference picture index," 7 pgs, Jul. 22-26, 2002, ftc. imtc-files.org/jvt-experts/2000_07_Klagenfurt/JVT-D122.doc.
(Continued)

*Primary Examiner* — Jessica M Prince
(74) *Attorney, Agent, or Firm* — Palak Bhakta; Vincent E. Duffy (57)    ABSTRACT

A method and apparatus are provided for motion estimation using combined reference bi-prediction. The apparatus includes an encoder (200) for encoding a multi-prediction picture from a combination of two or more reference pictures by respectively predicting a motion vector for a particular one of the two or more reference pictures in a motion estimation process while initializing motion vectors for remaining ones of the two or more reference pictures to a predefined value for use by the motion estimation process.

8 Claims, 7 Drawing Sheets

(51) Int. Cl.
  *H04N 1/56* (2006.01)
  *H04N 19/573* (2014.01)
  *H04N 19/58* (2014.01)
  *H04N 19/533* (2014.01)
  *H04N 19/517* (2014.01)

(56) References Cited

U.S. PATENT DOCUMENTS

| 7,376,186 | B2 * | 5/2008 | Boyce et al. | 375/240.15 |
| 8,638,853 | B2 * | 1/2014 | Tourapis et al. | 375/240.12 |
| 2003/0206589 | A1 * | 11/2003 | Jeon | 375/240.15 |

OTHER PUBLICATIONS

Flierl, et al.: "A Locally Optimal Design Algorithm for Block-Based Multi-Hypothesis Motion-Compensated Prediction", Proceedings of the Data Compression Conference, Snowbird, USA, 10 pages., Apr. 1998.

Wu S-W, et al: "Joint Estimation of Forward and Backward Motion Vectors for Interpolative Prediction of Video", IEEE Transactions on Image Processing, IEEE Service Center, Piscataway, NJ, US, vol. 3, No. 5, Sep. 3, 1994, pp. 684-687, XP000476841. 1057-7149.

Suhring: "Unified Coding Style for the H.26L Reference Software," JVT Reference Software Version JM7.4, 5 pgs., http://bs.hhi.de/suehring/tml/download/.

Wiegand, et al.: "Draft Errata List with Revision-Marked Corrections for H.264/AVC," San Diego, CA, 273 pgs., Sep. 2-5, 2003, ftp://ftp.imtc-files.org/jvt-experts/2003_09_San Diego/JVT-1050.zip.

Flierl, M. et al: "Rate-constrained multi-hypothesis motion-compensated prediction for video coding", Image Processing, 2000. Proceedings, 2000 International Conference on Sep. 10-13, 2000, Piscataway, NJ, USA, IEEE, Sep. 10, 2000, pp. 150-153, XP010529425.

Copy of the International Search Report, dated Dec. 28, 2007.

Tourapis et al., "Reference ASoftware Enhancements", 14. JVT Meeting, 71. MPEG Meeting Jan. 18-21, 2005, Hong Kong, No. JVT-N014r1, (Joint Video Team of ISO/IEC JTC1/SC29/WG11 and ITU-T SG 16).

Flierl et al., "Generalzed B pictures and the draft H.264/AVC video-compression standard", Circuits and Systems for Video Technology, IEEE Transactions on (Volume:13 , Issue: 7) Jul. 1, 2003, pp. 587-597.

European Office Action dated Jul. 21, 2015_12pages.

* cited by examiner

METHOD AND APPARATUS FOR MOTION ESTIMATION USING COMBINED REFERENCE BI-PREDICTION

CROSS-REFERENCE TO RELATED APPLICATIONS

This application claims the benefit, under 35 U.S.C. §365 of International Application PCT/US2007/002381 filed Jan. 30, 2007, which was published in accordance with PCT Article 21(2) on Aug. 16, 2007 in English and claims priority of U.S. Provisional patent application No. 60/764,452 filed Feb. 2, 2006.

TECHNICAL FIELD

The present principles relate generally to video encoding and, more particularly, to a method and apparatus for motion estimation using combined reference bi-prediction.

BACKGROUND

It is well known that multi-hypothesis motion compensation, as described in a first prior art approach, can provide considerable benefits within motion compensated video encoders and decoders. More specifically, bi-predictive (B) slices (or bi-predictive pictures in older standards and recommendations), which consider 2 hypotheses, are in general the most efficiently coded slices within the CODEC for the International Organization for Standardization/international Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"). This behavior is due to these slices being able to more efficiently exploit the temporal correlation that exists within a sequence by linearly combining two or more hypotheses together, so as to reduce their associated error. More specifically, in B slices, a macroblock or block is coded in such a way that it can be predicted by either one prediction (list0 or list1) or the linear combination of two predictions (list0 and list1), while associated weights for each list could provide additional benefits in the presence of fades or cross-fades. To perform this prediction, the decoder only requires that 1 or 2 motion vectors (MVs), depending on the prediction type, and their associated references (one for each associated list), are transmitted within the bitstream, or that these are inferred as in the case of direct modes.

Apparently in most encoders such as, for example, the current JM reference software, Joint Video Team (JVT) Reference Software version JM7.4, motion estimation for B slices (and for multi-hypothesis coding in general) considers each candidate reference within the available prediction lists separately during motion estimation and does not make any specific assumption for bi-prediction (or multi-hypothesis prediction respectively). For each prediction list, an encoder calculates the best single prediction motion vectors and, then, using these candidate motion vectors, the encoder generates an additional set of bi-predictive candidates that will be later used within a final mode decision, which will decide which mode (single or multiple prediction or even intra) will be used.

Figure 1:
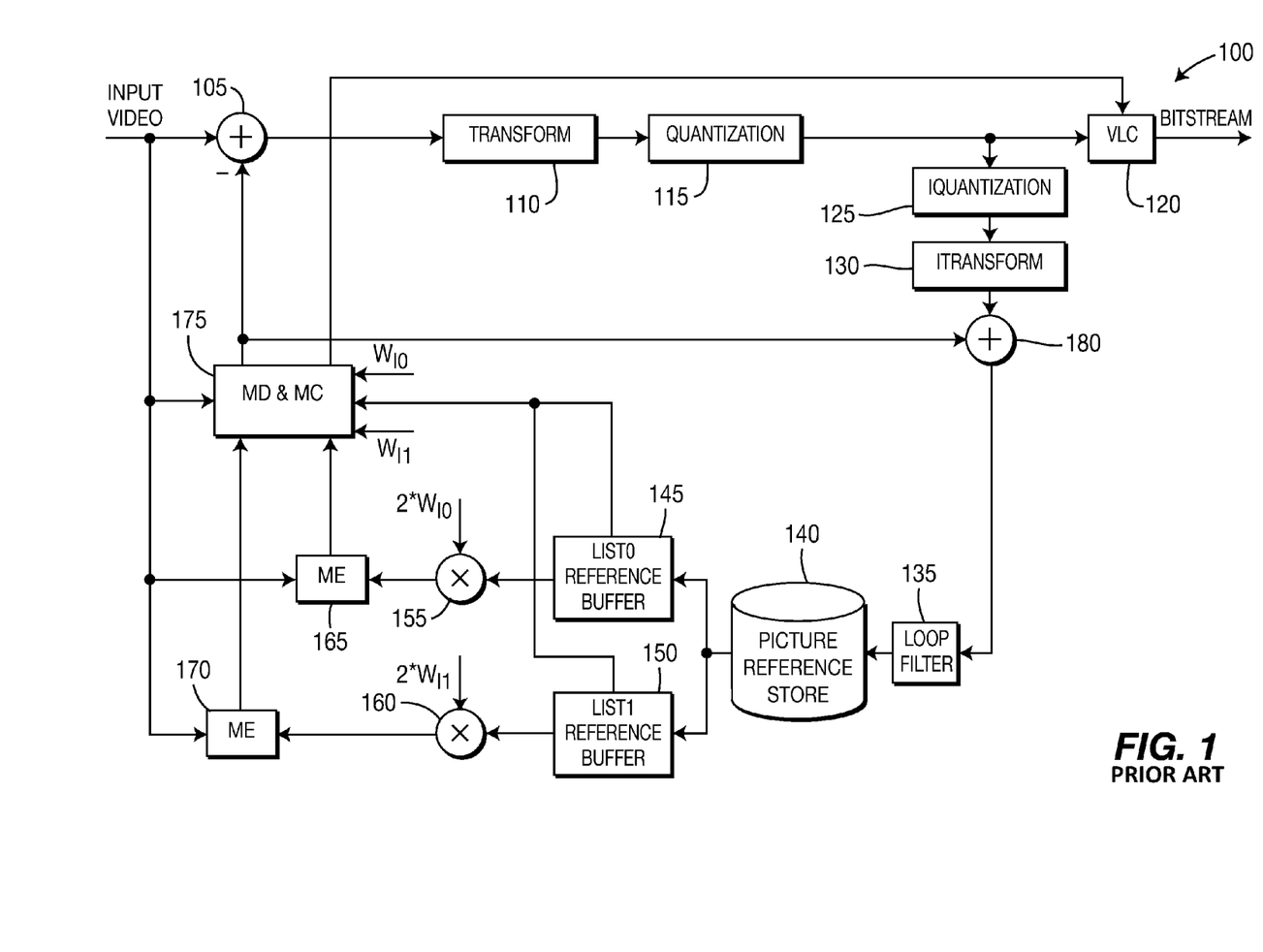
FIG. 1 shows a diagram for a video encoder that uses bi-prediction, in accordance with the prior art.

Turning to FIG. 1, a video encoder that uses bi-prediction is indicated generally by the reference numeral 100. A non-inverting input of a combiner 105, a first input of a Mode Decision (MD) & Motion Compensation (MC) 175, a first input of a motion estimator (ME) 165, and a first input of a motion estimator 170 are available as inputs to the video encoder. An output of the combiner 105 is connected in signal communication with an input of a transformer 110. An output of the transformer 110 is connected in signal communication with an input of a quantizer 115. An output of the quantizer 115 is connected in signal communication with an input of a variable length coder (VLC) 120. An output of the VLC 120 is available as an output of the video encoder 100.

The output of the quantizer 115 is also connected in signal communication with an input of an inverse quantizer 125. An output of the inverse quantizer 125 is connected in signal communication with an input of an inverse transformer 130. An output of the inverse transformer 130 is connected in signal communication with a first non-inverting input of a combiner 180. An output of the combiner 180 is connected in signal communication with an input of a loop filter 135. An output of the loop filter 135 is connected in signal communication with an input of a picture reference store 140. An output of the reference picture store 140 is connected in signal communication with an input of a List0 reference buffer 145 and with an input of a List 1 reference buffer 150. A first output of the List0 reference buffer 145 is connected in signal communication with a first input of multiplier 155. A first output of the List1 reference buffer 150 is connected in signal communication with a first input of a multiplier 160. A second output of the List0 reference buffer 145 and a second output of the List1 reference buffer 150 are connected in signal communication with a second input of the MD&MC 175. An output of the multiplier 155 is connected in signal communication with a second input of the motion estimator 165. An output of the multiplier 160 is connected in signal communication with a second input of the motion estimator 170. A first output of the MD&MC 175 is connected in signal communication with an inverting input of the combiner 105. A second output of the MD&MC 175 is connected in signal communication with a second non-inverting input of the combiner 180.

The above method is based on the assumption that these motion vectors are good enough to be used within bi-prediction. Unfortunately this assumption is not always true, potentially resulting in significant loss in efficiency. This is particularly true in the presence of cross-fades (dissolves) where overlapping objects from these images may have considerably different luminance characteristics and possibly motion, and the consideration of each list separately could potentially result in relatively poor performance. Therefore, it would be highly desirable to be able to jointly consider the available candidate references within the motion estimation phase, which could result in higher coding efficiency. On the other hand, this does not imply that each reference should not be considered separately since single prediction could still provide us with good results especially when considering that only a single set of motion vectors ($mv_0$ and $mv_1$ for references x and y, respectively) need to be transmitted in such a case, which is very important at low bitrates.

It is well known that motion estimation for a single candidate is itself rather computationally expensive. If a full search approach was used with a search window of ($\pm N, \pm M$), this would imply that $(2N+1) \times (2M+1)$ checking points would be tested. Obviously the brute force and, in a sense, optimal approach for bi-prediction would require $(2N+1)^2 \times (2M+1)^2$ checking points which is rather forbidding for any architecture. In the more general multi-hypothesis (k-prediction) case this would mean that $(2N+1)^K \times (2M+1)^K$ need to be tested. An alternative, considerably simpler, architecture was presented in the above-mentioned first prior art approach, where instead of the brute force method, an iterative approach was used where each hypothesis was examined and refined sequentially by considering the previously estimated hypothesis.

This method could, for a bi-predictive case, be summarized as follows: Assume that the current picture is z, and the two references under consideration are pictures x and y. For such pictures, weights a and b have been respectively selected for weighted prediction (i.e., for normal bi-prediction a=b=½). $mv_0$ and $mv_1$ are the motion vectors needed for motion compensation corresponding to the x and y references (or their weighted counterparts) respectively. For simplicity weighting offsets are ignored in this process, although similar consideration could apply. In the following procedure, SAD (sum of absolute difference) is used as a distortion measure.

Step 1. Set $mv_0=mv'_0=mv_1=mv'_1=0$.
Step 2. Form reference picture as ax.
Step 3. Perform motion estimation in ax to refine motion vectors $mv_0$ using distortion $SAD=|z-ax(mv_0)-by(mv'_1)|$.
Step 4. Set $mv'_0=mv_0$
Step 5. Form reference picture as by.
Step 6. Perform motion estimation in by to find motion vectors $mv_1$ using distortion $SAD=|z-by(mv_1)-ax(mv'_0)|$.
Step 7. If ($mv_1==mv'_1$) exit.
Step 8. Set $mv'_1=mv_1$
Step 9. Refine motion vectors $mv_0$ in ax using distortion $SAD=|z-ax(mv_0)-by(mv'_1)|$.
Step 10. If ($mv_0==mv'_0$) exit.
Step 11. Set $mv'_0=mv_0$
Step 12. Go to Step 6.

This may be generalized for the multiple hypothesis case. The problem with this method is that it may still require a large number of iterations. Moreover, while it is very likely that performance would be improved, it is also possible that the final prediction may not be the best possible, especially if the scheme is trapped at a local minimum. The implementation of this architecture is also rather complicated especially considering that it is necessary to reconstruct a new hypothesis using motion compensation for every iteration of the algorithm. An alternative but rather similar approach was proposed in the above-mentioned first prior art approach, where the initial zero motion vectors in step 1 were replaced with the motion vectors generated by considering each list independently.

Video compression encoders and decoders gain much of their compression efficiency by forming a prediction of the current picture (or slice) $P_{current}$ that is to be encoded, and by additionally encoding the difference between this prediction and the current picture. The more closely correlated the prediction is to the current picture, the fewer the bits that are needed to compress that picture. It is therefore desirable for the best possible picture prediction to be formed. This prediction can be generated through either spatial prediction methods (intra coding) or temporal methods (inter coding).

Temporal prediction methods basically employ motion compensated techniques in order to generate the prediction reference. This is usually done by dividing the source image into non-overlapping blocks of size N×M and by finding the best match within a reference picture $P_{reference}$, using motion estimation techniques. This best match is associated with a set of motion parameters that are also encoded within the bitstream. Newer standards, such as the MPEG-4 AVC standard, also allow the consideration of multiple reference pictures for the estimation and selection of the best prediction, by signaling the index of the reference used with the motion parameters. Such multi-reference encoders and decoders use a reference buffer, where each potential candidate reference is stored and accessed during encoding or decoding.

An alternative method that can considerably improve performance is to consider not only a single reference picture at a time, but instead the possibility of using combinations of multiple hypotheses as is, in particular, done for bi-predictive (B) picture/slice coding. Here the prediction may be generated through again either considering a single reference selected from a set of multiple references, but also by linearly combining (i.e. performing a weighted average) two available references. This would also require that, if necessary, two different motion parameter sets are estimated and transmitted that correspond to each reference. This concept can be generalized for encoders that consider more than 2 hypotheses as is described in the above-mentioned first prior art approach. Other parameters that could also improve performance include the consideration of weighted prediction as suggested in a second prior art approach, where a different weighting factor can be applied to each hypothesis, and more complicated motion models such as global motion compensation techniques are used.

Although the consideration of multi-hypothesis motion compensation could considerably improve the performance of a video codec, proper estimation of the motion parameters for this case is a very difficult problem. In particular, the optimal solution could be found by examining all possible prediction combinations with the available references that is, examine for each possible motion vector in a reference all other motion vectors and their combinations in the remaining references, which is obviously computationally forbidding.

SUMMARY

These and other drawbacks and disadvantages of the prior art are addressed by the present principles, which are directed to a method and apparatus for motion estimation using combined reference bi-prediction.

According to an aspect of the present principles, there is provided an apparatus. The apparatus includes an encoder for encoding a multi-prediction picture from a combination of two or more reference pictures by respectively predicting a motion vector for a particular one of the two or more reference pictures in a motion estimation process while initializing motion vectors for remaining ones of the two or more reference pictures to a predefined value for use by the motion estimation process.

According to another aspect of the present principles, there is provided a method. The method includes encoding a multi-prediction picture from a combination of two or more reference pictures by respectively predicting a motion vector for a particular one of the two or more reference pictures in a motion estimation process while initializing motion vectors for remaining ones of the two or more reference pictures to a predefined value for use by the motion estimation process.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to a method and apparatus for motion estimation using combined reference bi-prediction.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the pseudo code provided herein is merely for illustrative purposes and, thus, given the teachings of the present principles provided herein, one of ordinary skill in this and related arts will contemplate the following pseudo code sequences as well as variations thereof, while maintaining the scope of the present principles.

Figure 2:
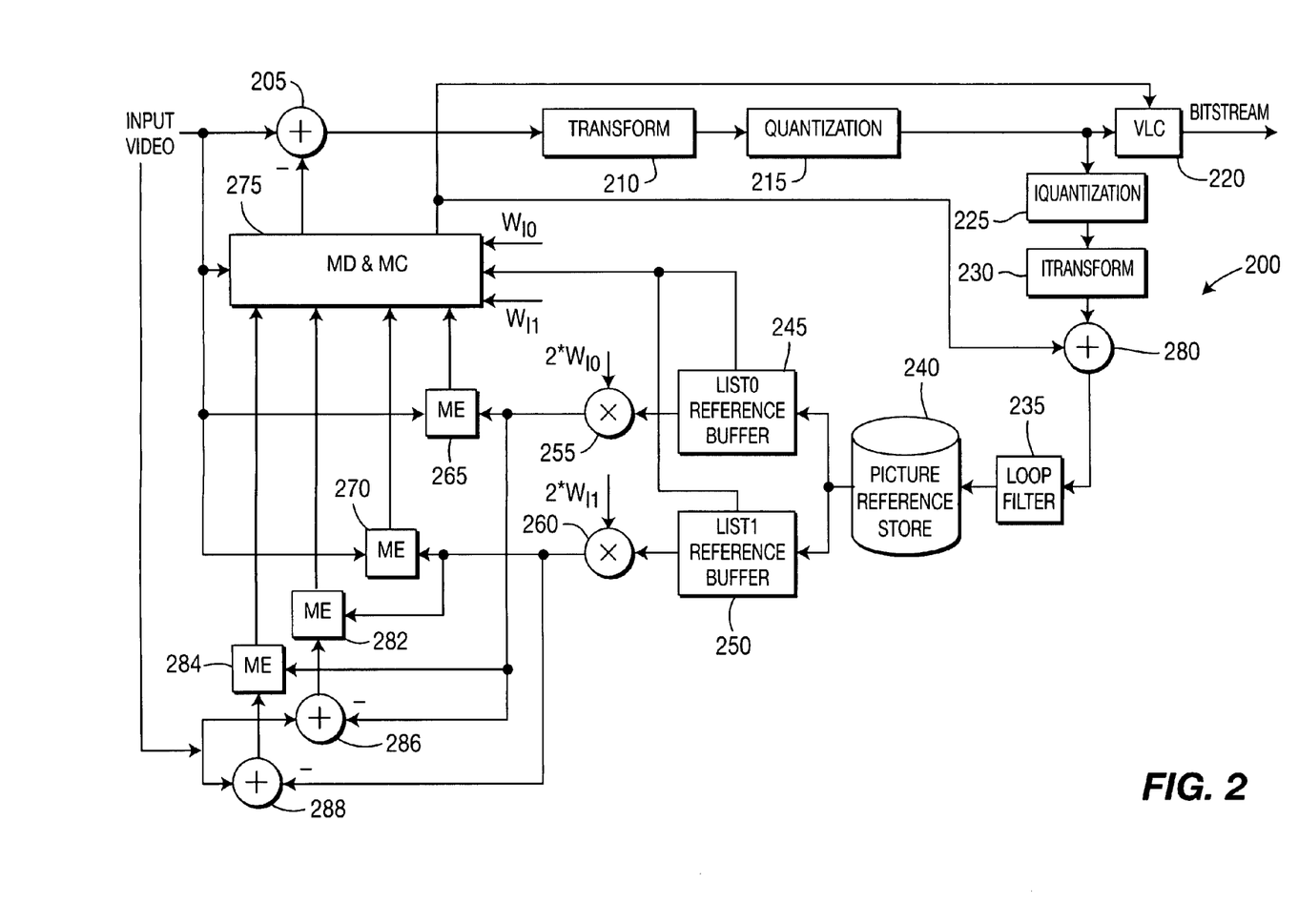
FIG. 2 shows a diagram for an exemplary video encoder that uses bi-prediction with subtraction consideration, in accordance with an embodiment of the present principles.

Turning to FIG. 2, an exemplary video encoder using bi-prediction with subtraction consideration is indicated generally by the reference numeral 200.

A non-inverting input of a combiner 205, a first input of a Mode Decision (MD) & Motion Compensation (MC) 275, a first input of a motion estimator (ME) 265, a first input of a motion estimator 270, a non-inverting input of a combiner 286, and a non-inverting input of a combiner 288 are available as inputs to the video encoder. An output of the combiner 205 is connected in signal communication with an input of a transformer 210. An output of the transformer 210 is connected in signal communication with an input of a quantizer 215. An output of the quantizer 215 is connected in signal communication with an input of a variable length coder (VLC) 220. An output of the VLC 220 is available as an output of the video encoder 200.

The output of the quantizer 215 is also connected in signal communication with an input of an inverse quantizer 225. An output of the inverse quantizer 225 is connected in signal communication with an input of an inverse transformer 230. An output of the inverse transformer 230 is connected in signal communication with a first non-inverting input of a combiner 280. An output of the combiner 280 is connected in signal communication with an input of a loop filter 235. An output of the loop filter 235 is connected in signal communication with an input of a picture reference store 240. An output of the reference picture store 240 is connected in signal communication with an input of a List0 reference buffer 245 and with an input of a List 1 reference buffer 250. A first output of the List0 reference buffer 245 is connected in signal communication with a first input of multiplier 255. A first output of the List1 reference buffer 250 is connected in signal communication with a first input of a multiplier 260. A second output of the List0 reference buffer 245 and a second output of the List1 reference buffer 250 are connected in signal communication with a second input of the MD&MC 275. An output of the multiplier 255 is connected in signal communication with a second input of the motion estimator 265. An output of the multiplier 260 is connected in signal communication with a second input of the motion estimator 270. A first output of the MD&MC 275 is connected in signal communication with an inverting input of the combiner 205. A second output of the MD&MC 275 is connected in signal communication with a second non-inverting input of the combiner 280.

The output of the multiplier 255 is also connected in signal communication with a first input of a motion estimator 284 and an inverting input of the combiner 286. The output of the multiplier 260 is also connected in signal communication with an inverting input of the combiner 288 and a first input of a motion estimator 282. An output of the combiner 288 is connected in signal communication with a second input of the motion estimator 284. An output of the combiner 286 is connected in signal communication with a second input of the motion estimator 282. An output of the motion estimator 284 is connected in signal communication with a third input of the MD&MC 275. An output of the motion estimator 282 is connected in signal communication with a fourth input of the MD&MC 275.

In accordance with the present principles, a method and apparatus are described that can significantly improve the encoding performance of bi-predictive pictures or slices within a video encoding architecture. While the present principles are primarily described with respect to the MPEG-4 AVC standard, it is to be appreciated that the present principles are not solely limited to the preceding standard and may be utilized with respect to other video coding standards and recommendations while maintaining the scope of the present principles.

In an embodiment of the present principles, we consider an additional reference picture within the motion estimation process, which is basically a linear combination of two other references. This new reference allows us to further refine the prediction reference within bi-predictive (B) pictures (combined reference bi-prediction) since a more accurate consideration of bi-prediction is performed, leading to higher encoding efficiency. In an embodiment of the present principles, an extension of this method to multi-hypothesis prediction is provided. Advantageously, the embodiment reduces the complexity of the multi-hypothesis motion estimation without adversely affecting quality to any significant degree.

In the above-mentioned first prior art approach, motion estimation for multi-hypothesis motion compensation is performed using an iterative method where, in each iteration, the motion vectors of a particular reference or hypothesis are refined while considering the previous estimated motion vectors of all other reference lists or hypotheses. It is also suggested that as an initial estimate, the single prediction motion vectors (MVs) could be used.

In an embodiment of the present principles, we propose using a different method for estimating the motion vectors of a particular reference, which although still based on an iterative method, can better estimate the motion vectors for each reference, while it may be much simpler under some conditions or architectures to implement.

An embodiment is based on the presumption that adjacent pictures tend to include a large percentage of stationary regions, even during fades and cross-fades. Unlike the above-mentioned first prior art approach, in which a sequence of iterations is performed to estimate the motion vectors of a particular reference based on the previous calculated motion vectors of all other already estimated references, in an embodiment, we first consider predicting the motion vectors of each reference by presuming that all other remaining references are stationary (see FIG. 2). Doing so allows us to better separate stationary from non-stationary regions and, therefore, can improve the motion estimation accuracy or the convergence of an iterative scheme as done in the first prior art approach. More specifically this solution presents several alternative possibilities.

In an embodiment, a first approach in accordance with the present principles for performing motion estimation using combined reference bi-prediction involves performing parallel iterations to optimize the remaining hypotheses. The parallelization is realized by starting the performance of motion estimation with different reference indexes, while presuming the motion vectors for other reference indices are 0. This concept can be explained by studying the following pseudocode, which can be used for every block and presuming that we have N number of hypotheses. In the following pseudocode, the following designations are used: $x_i$ denotes the reference picture with index i; $w_i$ denotes its associated weight for weighted prediction; $mv_{j,k,i}$ denotes the motion vector computed for the reference with index j, if ME is performed starting with reference index i; and k={0,1} is used to verify whether any change in the motion vectors has occurred during the iteration process and whether the algorithm needs to terminate or not. In particular, if N=2 we have the following:

```
for (i = 0; i < 2; i++)
{
    mv_{0,0,i}=mv_{0,1,i}= mv_{1,0,i}=mv_{1,1,i}= (0,0);
    //! perform ME starting using reference index i
      reference = w_i * x_i;
    if (i==0) j=1;
    else j=0;
    source = z - w_j * x_j;
      //! Perform ME using reference to refine motion vectors mv_{i,0}
    //! using distortion SAD = | source - reference(mv_{m,0,i})|.
    Motion_Estimation(source, reference, mv_{i,0,i}, minSAD_i)
    do
    {
        for (m=0; m< 2; m++)
        {
            reference = w_m * x_m;
            source=z ;
            if (m==0) j=1;
            else j = 0;
            source=z - w_j * x_j(mv_{j,0,i});
              //! Perform ME using reference to refine mv_{m,0,i}
              //! using distortion SAD = | source - reference(mv_{m,0,i})|.
```

-continued

```
    Motion_Estimation(source, reference, mv_{m,0,i}, minSAD_i);
  }
  for (j = 0; j < 2; j++)
  {
      if (mv_{j,0,i}!=mv_{j,1,i})
      {
          iterate=1;
          mv_{j,1,i}=mv_{j,0,i};
          break;
      }
      else iterate=0;
  };
}
while (iterate==1)
}
```

The above pseudo-code would result in potentially 2 combinations of motion vectors for each different hypothesis. We may then select the best combination using the one leading to the smallest distortion, that is:

```
if (minSAD_0 < minSAD_1)
{
    best_mv={mv_{0,0,0}, mv_{1,0,0}}
    minSAD= minSAD_0;
}
else
{
    best_mv={mv_{0,0,1}, mv_{1,0,1}}
    minSAD= minSAD_1;
}
```

The more general algorithm for N hypotheses is as follows:

```
for (i = 0; i < N; i++)
{
    reference=w_i * x_i;
    source=z ;
    for (j = 0; j < N; j++)
    {
        mv_{j,0,i}=mv_{j,1,i}=(0,0);
        if (j!=i) source=source- w_j * x_j(mv_{j,0,i});
    };
    //! Perform ME using reference to refine motion vectors mv_{i,0,i}
    //! using distortion SAD = | source - reference(mv_{m,0,i})|.
    Motion_Estimation(source, reference, mv_{i,0,i}, minSAD_i);
    do
    {
        for (m=0; m< N; m++)
        {
            reference = w_m * x_m;
            source=z ;
            for (j = 0; j < N; j++)
            {
                if (j!=m) source=source - w_j * x_j(mv_{j,0,i}) ;
            };
            //! Perform ME using reference to refine mv_{m,0}
            //! using distortion SAD = | source - reference(mv_{m,0,i})|.
            Motion_Estimation(source, reference, mv_{m,0,i}, minSAD_i);
        }
        for (j = 0; j < N; j++)
        {
            if (mv_{j,0,i}!=mv_{j,1,i})
            {
                iterate=1;
                mv_{j,1,i}=mv_{j,0,i};
                break;
            }
            else iterate=0;
        };
    }
    while (iterate==1)
}
```

In this case, we may have up to N possible combinations of motion vectors for each different hypothesis. We can then select the best combination using the following method:

```
minSAD=minSAD_0;
best_mv={mv_{0,0,0}, mv_{1,0,0}, ... , mv_{m,0,0}, ... , mv_{N-1,0,0}}
for (i = 1; i < N-1; i++)
{
    if (minSAD_i < minSAD)
    {
        minSAD=minSAD_i;
        best_mv={mv_{0,0,i}, mv_{1,0,i}, ... , mv_{m,0,i}, ... , mv_{N-1,0,i}}
    }
}
```

This decision could also be made within the mode decision process (using Sum of Square Error (SSE) as the distortion metric, combined with the actual bits required to encode the motion vectors with a given Lagrangian parameter), while we may also allow combinations of motion vectors from each set, or even other predictors, or motion vectors previously estimated such as spatial/temporal direct motion vectors, single direction motion vectors, zero motion vectors, temporarily collocated motion vectors, and so forth, which could lead to extra hypothesis within the mode decision. Note also that depending on the implementation the maximum number of iterations, or even the number of parallel refinements performed, could be predefined, thus reducing complexity for a given system.

In an embodiment, a second approach in accordance with the present principles for performing motion estimation using combined reference bi-prediction will now be described. It is to be appreciated that performing all possible iterations as was described in the first approach in accordance with the present principles is still rather complex. The second approach in accordance with the present principles involves performing only the first step for each hypothesis, and then performing an iterative refinement based only on the best one (based on a minimum distortion criterion). This can considerably reduce complexity, while still achieving similar performance. The pseudo-code for the second approach is as follows:

```
for (i = 0; i < N; i++)
{
    reference=w_i * x_i;
    source=z ;
    for (j = 0; j < N; j++)
    {
        mv_{j,0,i}=mv_{j,1,i}=(0,0);
        if (j!=i) source=source- w_j * x_j(mv_{j,0,i});
    };
    //! Perform ME using reference to refine motion vectors mv_{i,0}
    //! using distortion SAD = | source - reference(mv_{m,0,i})|.
    Motion_Estimation(source, reference, mv_{i,0,i}, minSAD_i);
}
minSAD=minSAD_i;
best_mv={mv_{0,0,0},0,0,...};
best_ref=0;
for (i = 1; i < N-1; i++)
{
    if (minSAD_i < minSAD)
    {
        minSAD=minSAD_i;
        best_mv={0,0,...,mv_{i,0,i},..., 0,0};
        best_ref=i;
    }
}
do
{
```

```
    for (m=0; m< N; m++)
    {
        reference=w_m * x_m;
        source=z ;
        for (j = 0; j < N; j++)
        {
            if (j!=m) source=source- w_j * x_j(mv_{j,0,best_ref}) ;
        };
        //! Perform ME using reference to refine motion vectors mv_{i,0}
        //! using distortion SAD = | source - reference(mv_{m,0,i})|.
        Motion_Estimation(source,reference,mv_{m,0,best_ref},
        minSAD_{best_ref})
    }
    for (j = 0; j < N; j++)
    {
        if (mv_{j,0,best_ref}!=mv_{j,1,best_ref})
        {
            iterate=1;
            mv_{j,1,best_ref}=mv_{j,0,best_ref};
            break;
        }
        else iterate=0;
    };
}
while (iterate==1)
minSAD=minSAD_{best_ref};
best_mv={mv_{0,0,best_ref}, mv_{1,0,best_ref}, ... , mv_{m,0,best_ref} ... ,
mv_{N-1,0,best_ref}}
```

The initial reference selection could also be based on how similar (or more specifically dissimilar) is a reference to the source image. For example, we may start refining the reference with the highest distortion compared to the source, while all others are initially considered as stationary, and the iteration steps are performed as previously described with respect to the first approach in accordance with the present principles.

In an embodiment, a third approach in accordance with the present principles for performing motion estimation using combined reference bi-prediction will now be described. We observe that we have considered zero motion vectors for the initial step of our exemplary algorithm in the above two approaches in accordance with the present principles. It is nevertheless possible to also consider previously generated motion vectors (e.g., single or any M-number hypothesis) as alternative solutions and select the best one for the refinement process. This can be done by examining which one of these predictors, such as temporal/spatial direct motion vectors, single direction motion vectors, zero motion vectors, temporarily collocated motion vectors, and so forth, would result in a source image with the smallest distortion relative to the initial reference without the need of performing additional motion estimation/compensation steps. This predictor is then used instead of the zero predictor in all of the previous steps for the refinement of all other motion vectors.

In an embodiment, a fourth approach in accordance with the present principles for performing motion estimation using combined reference bi-prediction will now be described. The fourth approach represents a simpler approach which could nevertheless result in some efficiency loss compared to the above methods, and involves considering all hypotheses as having identical motion (i.e., all references are associated to the same, identical motion vectors), and refine their prediction together compared to the source image. This can be done as follows:

```
reference=[ ];
source=z ;
for (j = 0; j < N; j++)
{
    mv_{j,0,i}=mv_{j,1,i}=(0,0);
    reference=reference + w_j * x_j(mv_{j,0,i});
};
//! Perform ME using reference to refine motion vectors mv_{i,0}
//! using distortion SAD = | source - reference(mv)|.
Motion_Estimation(source, reference, mv, minSAD)
best_mv={mv,mv,...,mv};
```

We point out that the above exemplary algorithms estimate the potentially best combination motion vectors if N references are used. Nevertheless an encoder may also be able to choose the number of references for a given macroblock, since that could result in better performance, either due to better prediction or due to reduced overhead. Obviously though this process can be repeated for all possible reference combinations while, at the end, the reference combination leading to the best performance can be selected using a given criterion. In particular, when the number of possible references/hypotheses is two then, based on the above, we may consider the following three cases.

Regarding the first case relating to the fourth approach in accordance with the present principles, we consider each reference (x or y) separately as being stationary compared to the source picture z (case 1 without any iteration) and compute the motion of the other reference using the following distortion metrics, while also considering the appropriate weights (a and b respectively) from the weight estimation process as follows:

$$SAD=|(z-by)-ax(mv_2)|,$$

$$SAD=|(z-ax)-by(mv_3)|.$$

During mode decision, we can consider the following modes/motion vectors: single prediction; bi-predictive mode using $mv_0$ and $mv_1$ computed using single prediction ME; direct mode; bi-predictive mode using $mv_2$ and (0,0); bi-predictive mode using (0,0) and $mv_3$; bi-predictive mode using $mv_2$ and $mv_3$; and optional consideration of bi-predictive modes using $mv_2$ and $mv_1$, or $mv_0$ and $mv_3$, or even combinations with the direct motion vectors.

Regarding the second case relating to the fourth approach in accordance with the present principles, we consider only one reference as being stationary compared to the source picture and compute the motion of the other reference (constrained case 1 with no iterations) using the following distortion metric, while also considering the appropriate weights from the weight estimation process as follows:

$$SAD=|(z-by)-ax(mv_2)|.$$

During mode decision we can consider the following cases: single prediction; bi-predictive mode using $mv_0$ and $mv_1$ computed using single prediction ME; direct mode; bi-predictive mode using $mv_2$ and (0,0); and optional (recommended) consideration of bi-predictive modes using $mv_2$ and $mv_1$, or even combinations with the direct motion vectors.

For this method, it is necessary to also select which one of the two references is to be considered as stationary. Several options exist such as, for example: (a) select the list0 or list1 reference; (b) select the temporally closest; and (c) select the one which appears as most similar with the source picture. A combination metric could also be considered, while this process could be done either at the picture/slice level (all blocks within a slice are estimated using the same method), or macroblock/block level (reference decision is made for each block).

Regarding the third case relating to the fourth approach in accordance with the present principles, we combine both images together presuming zero motion between them. Then, we perform motion estimation using this picture as a new reference as follows:

$$SAD=|(z-ax(mv)-by(mv)|.$$

During mode decision we can consider the following cases: single prediction; bi-predictive mode using $mv_0$ and $mv_1$ computed using single prediction ME; direct mode; bi-predictive mode using mv for both references; and optional (recommended) consideration of bi-predictive modes using mv and $mv_1$, and $mv_0$ and mv, or even combinations with the direct motion vectors.

Figure 3:
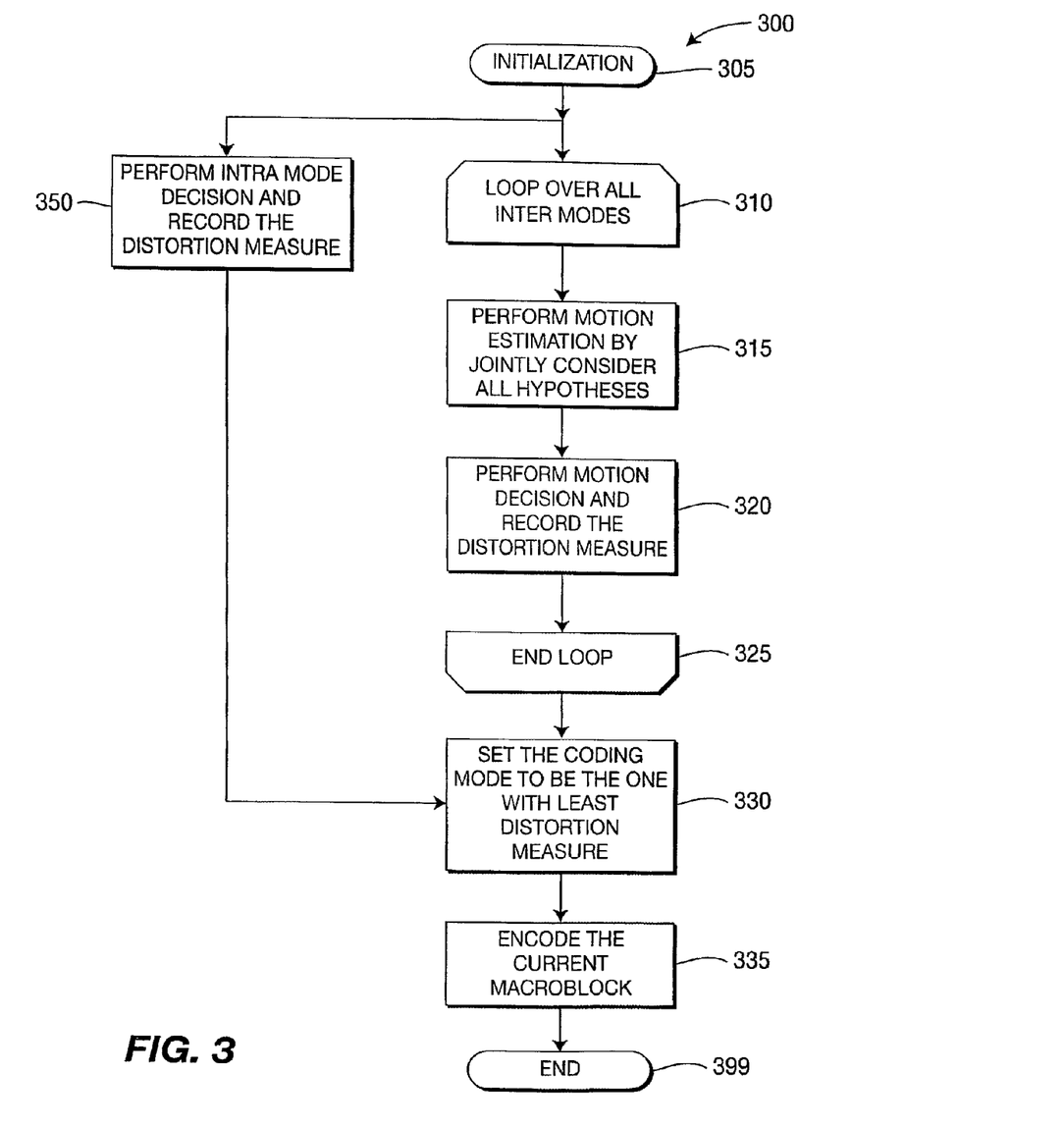
FIG. 3 shows an exemplary method for encoding a macroblock using bi-prediction, in accordance with an embodiment of the present principles.

Turning to FIG. 3, an exemplary method for encoding a macroblock using bi-prediction is indicated generally by the reference numeral 300. The method 300 includes an initialization block 305 that passes control to a function block 350 and a loop limit block 310.

The function block 350 performs intra mode decision, records the distortion measure, and passes control to a function block 330.

The loop limit block 310 begins a loop over all of the inter modes, and passes control to a function block 315. The function block 315 performs motion estimation by jointly considering all hypotheses, and passes control to a function block 320. The function block 320 performs mode decision, records the distortion measure, and passes control to a loop limit block 325 that ends the loop, and passes control to the function block 330.

The function block 330 sets the coding mode to be the one with the least distortion measure, and passes control to a function block 335. The function block 335 encodes the current macroblock, and passes control to an end block 399.

Figure 4:
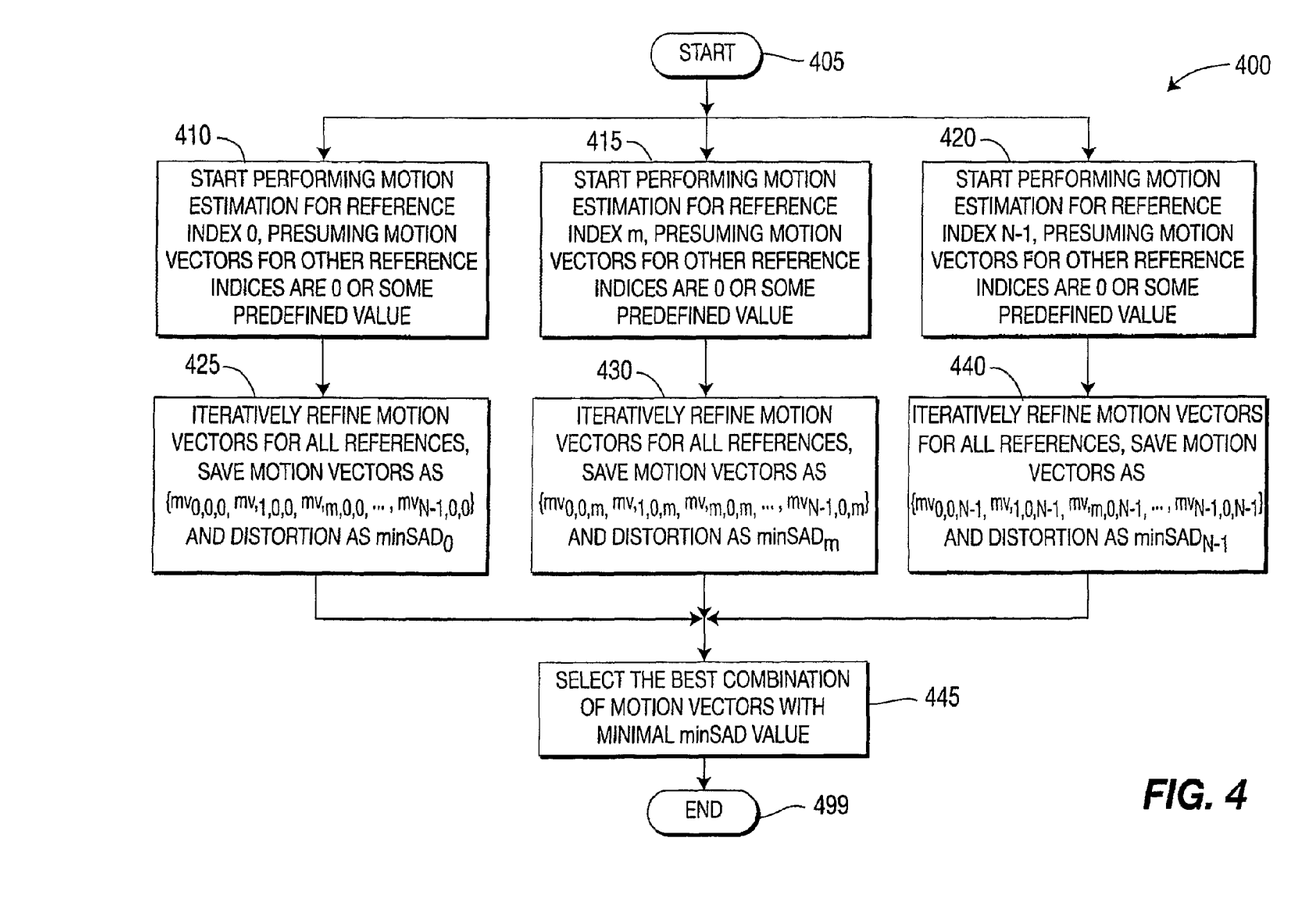
FIG. 4 shows an exemplary method for motion estimation using combined reference bi-prediction, where parallel iterations are performed to optimize remaining hypothesis, in accordance with an embodiment of the present principles.

Turning to FIG. 4, an exemplary method for motion estimation using combined reference bi-prediction, where parallel iterations are performed to optimize remaining hypothesis, is indicated generally by the reference numeral 400.

The method 400 includes a start block 405 that passes control to a function block 410, a function block 415, and a function block 420.

The function block 410 starts performing motion estimation for reference index 0, presuming motion vectors for other reference indices are 0 or some pre-defined value, and passes control to a function block 425. The function block 425 iteratively refines motion vectors for all references, save the motion vectors as $\{mv_{0,0,0}, mv_{1,0,0}, \ldots, mv_{m,0,0}, \ldots, mv_{N-1,0,0}\}$ and distortion as $minSAD_0$, and passes control to a function block 445.

The function block 415 starts performing motion estimation for reference index m, presuming motion vectors for other reference indices are 0 or some pre-defined value, and passes control to a function block 430. The function block 430 iteratively refines motion vectors for all references, save the motion vectors as $\{mv_{0,0,m}, mv_{1,0,m}, \ldots, mv_{m,0,m}, \ldots, mv_{N-1,0,m}\}$ and distortion as $minsAD_m$ and passes control to the function block 445.

The function block 420 starts performing motion estimation for reference index N-1, presuming motion vectors for other reference indices are 0 or some pre-defined value, and passes control to a function block 440. The function block 440 iteratively refines motion vectors for all references, save the motion vectors as $\{mv_{0,0,N-1}, mv_{1,0,N-1}, \ldots, mv_{m,0,N-1}, \ldots, mv_{N-1,0,N-1}\}$ and distortion as $minSAD_{N-1}$, and passes control to the function block 445.

The function block 445 select the best combination of motion vectors with the minimal minSAD value, and passes control to an end block 499.

Figure 5:
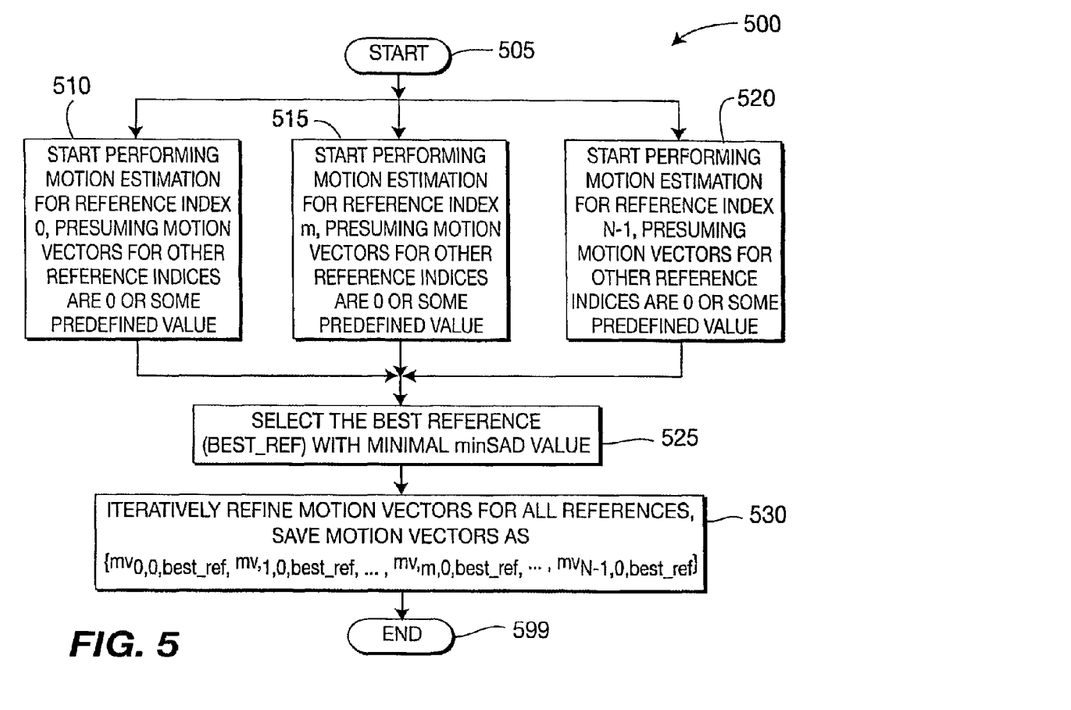
FIG. 5 shows an exemplary method for motion estimation using combined reference bi-prediction, where motion vectors are iteratively refined based on a best reference, in accordance with an embodiment of the present principles.

Turning to FIG. 5, an exemplary method for motion estimation using combined reference bi-prediction, where motion vectors are iteratively refined based on a best reference, is indicated generally by the reference numeral 500.

The method 500 includes a start block 505 that passes control to a function block 510, a function block 515, and a function block 520.

The function block 510 starts performing motion estimation for reference index 0, presuming motion vectors for other reference indices are 0 or some pre-defined value, and passes control to a function block 525.

The function block 515 starts performing motion estimation for reference index m, presuming motion vectors for other reference indices are 0 or some pre-defined value, and passes control to the function block 525.

The function block 520 starts performing motion estimation for reference index N-1, presuming motion vectors for other reference indices are 0 or some pre-defined value, and passes control to the function block 525.

The function block 525 select the best reference (best_ref) with minimal minSAD value, and passes control to a function block 530. The function block 530 iteratively refine motion vectors for all references, save the motion vectors as $\{mv_{0,0,best\_ref}, mv_{1,0,best\_ref}, \ldots, mv_{m,0,best\_ref}, \ldots, mv_{N-1,0,best\_ref}\}$, and passes control to an end block 599.

Figure 6:
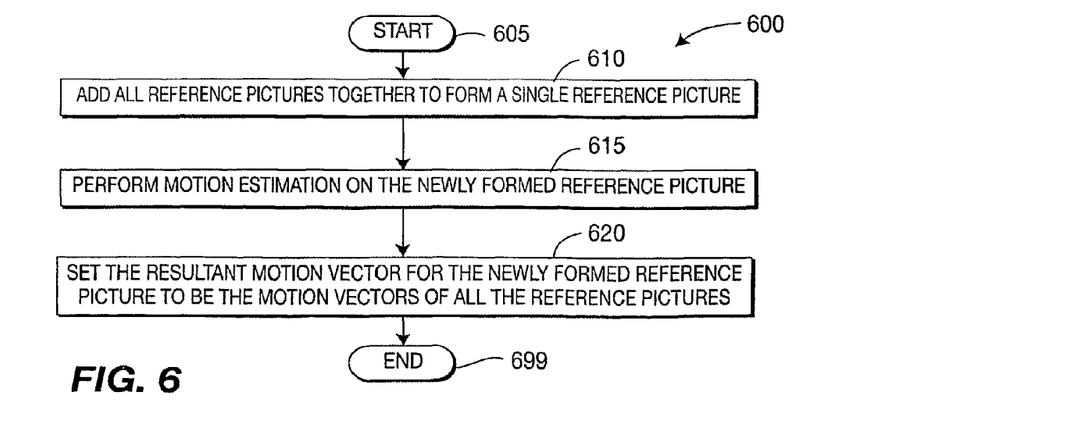
FIG. 6 shows an exemplary method for motion estimation that considers all hypothesis as having identical motion vectors, in accordance with an embodiment of the present principles.

Turning to FIG. 6, an exemplary method for motion estimation that considers all hypothesis as having identical motion vectors is indicated generally by the reference numeral 600.

The method 600 includes a start block 605 that passes control to a function block 610. The function block 610 adds all reference pictures together to form a single reference picture, and passes control to a function block 615. The function block 615 performs motion estimation on the newly formed reference picture, and passes control to a function block 620. The function block 620 sets the resultant motion vector for the newly formed reference picture to be the motion vectors of all the reference pictures, and passes control to an end block 699.

Figure 7:
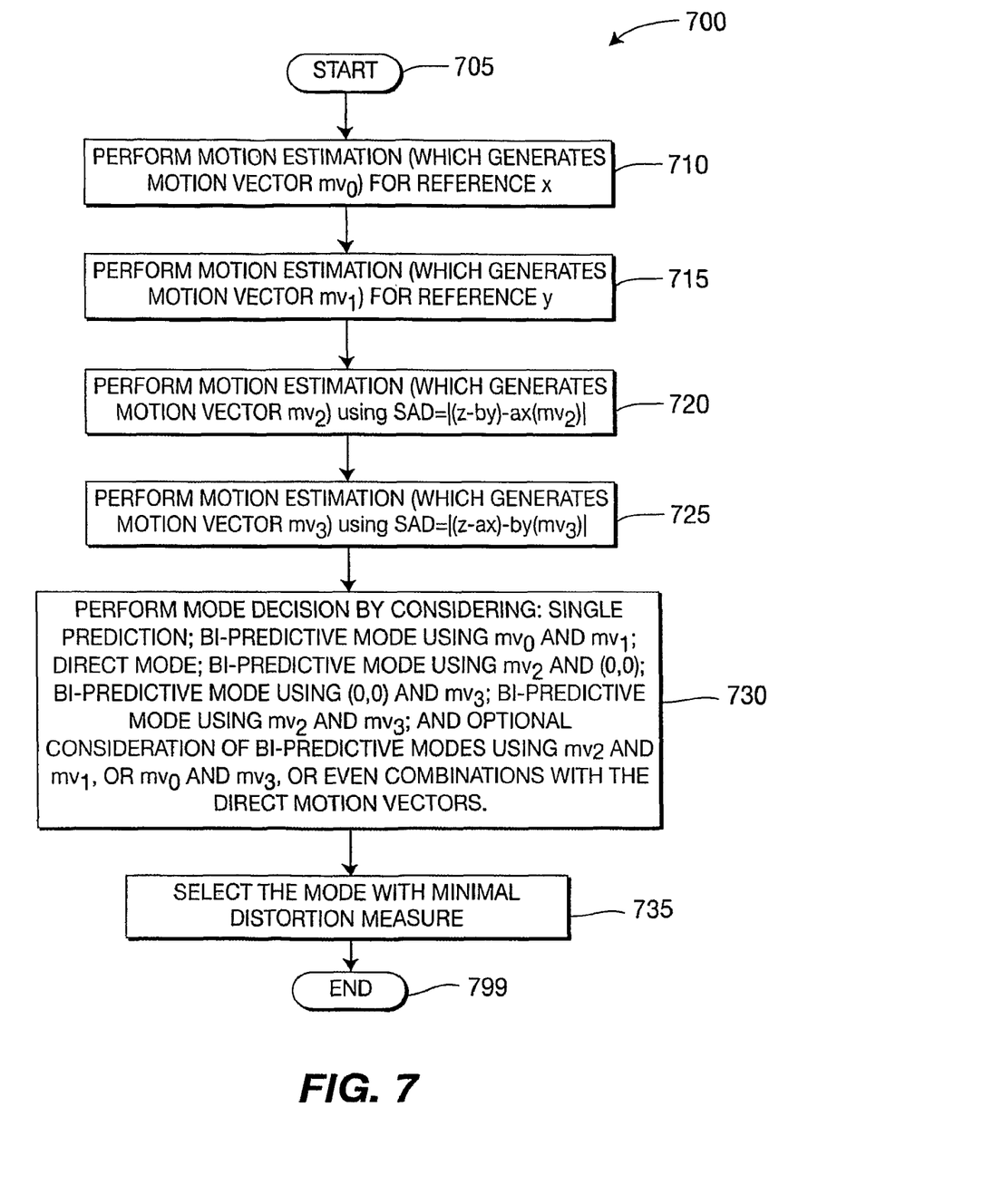
FIG. 7 shows an exemplary method for performing motion estimation using combined reference bi-prediction, where each reference (x or y) is considered separately as being stationary compared to a source picture z, in accordance with an embodiment of the present principles.

Turning to FIG. 7, an exemplary method for performing motion estimation using combined reference bi-prediction, where each reference (x or y) is considered separately as being stationary compared to a source picture z, is indicated generally by the reference numeral 700.

The method 700 includes a start block 705 that passes control to a function block 710. The function block 710 performs motion estimation (which generates motion vector $mv_0$) for reference x, and passes control to a function block 715. The function block 715 performs motion estimation (which generates motion vector $mv_1$) for reference y, and passes control to a function block 720. The function block 720 performs motion estimation (which generates motion vector $mv_2$) using $SAD=|(z-by)-ax(mv_2)|$, and passes control to a function block 725. The function block 725 performs motion estimation ($mv_2$) using $SAD=|(z-ax)-by(mv_3)|$, and passes control to a function block 730. The function block 730 performs mode decision, and passes control to a function block 735. Regarding the mode decision performed by the function block 730, such mode decision may be performed by considering, e.g.: single prediction; bi-predictive mode using $mv_0$ and $mv_1$; direct mode; bi-predictive mode using $mv_2$ and (0,0); bi-predictive mode using (0,0) and $mv_3$; bi-predictive mode using $mv_2$ and $mv_3$; and optional consideration of bi-predictive modes using $mv_2$ and $mv_1$, or $mv_0$ and $mv_3$, or even combinations with the direct motion vectors. The preceding considerations are exemplary and, thus, given the teachings of the present principles provided herein, these and other considerations may also be utilized with respect to the mode decision performed by the function block 730, while maintaining the scope of the present principles.

The function block 735 selects the mode with minimal distortion measure, and passes control to an end block 799.

Figure 8:
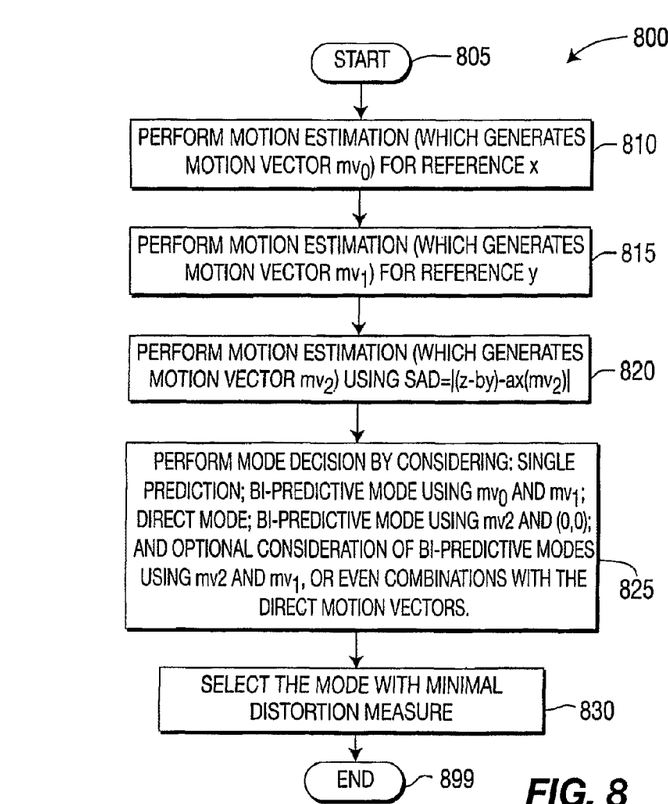
FIG. 8 shows an exemplary method for performing motion estimation using combined reference bi-prediction, where only one reference is considered as being stationary compared to a source picture, in accordance with an embodiment of the present principles.

Turning to FIG. 8, an exemplary method for performing motion estimation using combined reference bi-prediction, where only one reference is considered as being stationary compared to a source picture, is indicated generally by the reference numeral 800. The method 800 includes a start block 805 that passes control to a function block 810. The function block 810 performs motion estimation (which generates motion vector $mv_0$) for reference x, and passes control to a function block 815. The function block 815 performs motion estimation (which generates motion vector $mv_1$) for reference y, and passes control to a function block 820. The function block 820 performs motion estimation (which generates motion vector $mv_2$) using SAD=|(z−by)−ax($mv_2$)|, and passes control to a function block 825. The function block 825 performs mode decision, and passes control to a function block 830. Regarding the mode decision performed by the function block 825, such mode decision may be performed by considering, e.g.: single prediction; bi-predictive mode using $mv_0$ and $mv_1$; direct mode; bi-predictive mode using $mv_2$ and (0,0); and optional consideration of bi-predictive modes using $mv_2$ and $mv_1$, or even combinations with the direct motion vectors. The preceding considerations are exemplary and, thus, given the teachings of the present principles provided herein, these and other considerations may also be utilized with respect to the mode decision performed by the function block 825, while maintaining the scope of the present principles.

The function block 830 selects the mode with minimal distortion measure, and passes control to an end block 899.

Figure 9:
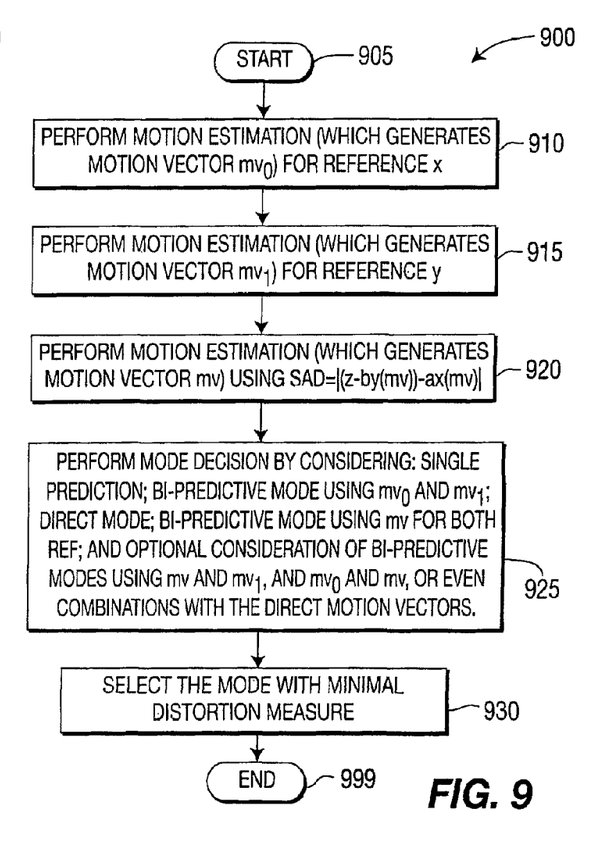
FIG. 9 shows an exemplary method for performing motion estimation using combined reference bi-prediction, where both references are combined presuming zero motion between the references, in accordance with an embodiment of the present principles.

Turning to FIG. 9, an exemplary method for performing motion estimation using combined reference bi-prediction, where both references are combined presuming zero motion between the references, is indicated generally by the reference numeral 900. The method 900 includes a start block 905 that passes control to a function block 910. The function block 910 performs motion estimation (which generates motion vector $mv_0$) for reference x, and passes control to a function block 925. The function block 915 performs motion estimation (which generates motion vector $mv_1$) for reference y, and passes control to a function block 920. The function block 920 performs motion estimation (which generates motion vector mv) using SAD=|(z−by(mv)−ax(mv)|, and passes control to a function block 925. The function block 925 performs mode decision, and passes control to a function block 930. Regarding the mode decision performed by the function block 925, such mode decision may be performed by considering, e.g.: single prediction; bi-predictive mode using $mv_0$ and $mv_1$; direct mode; bi-predictive mode using mv for both ref; and optional consideration of bi-predictive modes using mv and $mv_1$, and $mv_0$ and $mv_1$ or even combinations with the direct motion vectors. The preceding considerations are exemplary and, thus, given the teachings of the present principles provided herein, these and other considerations may also be utilized with respect to the mode decision performed by the function block 925, while maintaining the scope of the present principles.

The function block 930 selects the mode with minimal distortion measure, and passes control to an end block 999.

A description will now be given of some of the many attendant advantages/features of the present invention, some of which have been mentioned above. For example, one advantage/feature is an apparatus that includes an encoder for encoding a multi-prediction picture from a combination of two or more reference pictures by respectively predicting a motion vector for a particular one of the two or more reference pictures in a motion estimation process while initializing motion vectors for remaining ones of the two or more reference pictures to a predefined value for use by the motion estimation process.

Another advantage/feature is the apparatus having the encoder as described above, wherein the encoder predicts the motion vector for the particular one of the two or more references by considering the remaining ones of the two or more reference pictures as stationary.

Still another advantage/feature is the apparatus having the encoder as described above, wherein the encoder predicts the motion vectors for each of the two or more references in respective parallel portions of a first one of multiple iterative processes, and refines the motion vectors in subsequent ones of the multiple iterative processes. Yet another advantage/feature is the apparatus having the encoder that predicts the motion vectors for each of the two or more references in the respective parallel portions of the first one of multiple iterative processes and refines the motion vectors in subsequent ones of the multiple iterative processes as described above, wherein the encoder selects a best motion vector combination resulting from the multiple iterative processes based on a distortion measure.

Moreover, another advantage/feature is the apparatus having the encoder as described above, wherein at least one of the motion vectors for at least one of the remaining ones of the two or more reference pictures is initialized to the pre-defined value based on previously computed motion vectors for the at least one of the remaining ones of the two or more reference pictures. Further, another advantage/feature is the apparatus having the encoder wherein the at least one of the motion vectors for the at least one of the remaining ones of the two or more reference pictures is initialized based on the previous computed motion vectors for the at least one of the remaining ones of the two or more reference pictures as described above, wherein the previously computed motion vectors comprise at least one direct motion vector and a motion vector previously computed from combining a lesser number of reference pictures than the two or more reference pictures, wherein the at least one direct motion vector includes at least one of at least one temporal direct motion vector and at least one spatial direct motion vector. Also, another advantage/feature is the apparatus having the encoder wherein the at least one of the motion vectors for the at least one of the remaining ones of the two or more reference pictures is initialized based on the previous computed motion vectors for the at least one of the remaining ones of the two or more reference pictures as described above, wherein said encoder uses an iterative process to predict the motion vectors for the two or more reference pictures, and renders a decision regarding the motion vectors to be initially used in the iterative process, from among the at least one of the motion vectors initialized to the predefined value and the previously computed motion vectors, based upon a correlation metric.

Additionally, another advantage/feature is the apparatus having the encoder as described above, wherein the encoder predicts the motion vectors for the two or more reference pictures using an iterative process. Moreover, another advantage/feature is the apparatus having the encoder that predicts the motion vectors for the two or more reference pictures using the iterative process as described above, wherein the encoder constrains a maximum number of iterations performed by the iterative process. Further, another advantage/feature is the apparatus having the encoder that predicts the motion vectors for the two or more reference pictures using the iterative process as described above, wherein the encoder constrains a maximum number of the two or more reference pictures to be tested in parallel by the iterative process.

Also, another advantage/feature is the apparatus having the encoder as described above, wherein the encoder estimates the motion vectors for the two or more reference pictures based on weights used for the two or more reference pictures from a previous weight estimation process.

Additionally, another advantage/feature is the apparatus having the encoder as described above, wherein the encoder estimates the motion vectors for the two or more reference pictures using multiple iterative processes in parallel, the multiple iterative processes having different initialization points respectively corresponding to different ones of the two or more reference pictures. Moreover, another advantage/feature is the apparatus having the encoder that performs the multiple iterative processes as described above, wherein the encoder performs a first one of the multiple iterative processes to provide initial values for the motion vectors for each of the two or more reference pictures, selects a best initial one of the two or more references based on a lowest distortion measure, and performs subsequent ones of the multiple iterative processes to refine the initial values obtained for the best initial one of the two or more references.

Further, another advantage/feature is the apparatus having the encoder as described above, wherein the encoder predicts motion information for the multi-prediction picture based on the motion vectors for the two or more reference pictures being identical, and jointly refines the motion vectors compared to the multi-prediction picture.

Also, another advantage/feature is the apparatus having the encoder as described above, wherein the encoder estimates motion vector information for the multi-prediction picture by combining the two or more reference pictures into a combined reference picture and using zero motion between the two or more reference pictures.

Additionally, another advantage/feature is the apparatus having the encoder as described above, wherein the encoder predicts a respective motion vector for each of the two or more reference pictures by separately considering remaining ones of the two or more reference pictures as being stationary compared to the multi-prediction picture. Moreover, another advantage/feature is the apparatus having the encoder that predicts the respective motion vector for each of the two or more reference pictures by separately considering the remaining ones of the two or more reference pictures as being stationary compared to the multi-prediction picture as described above, wherein the encoder predicts the respective motion vector for each of the two or more reference pictures by selecting a respective weight there for.

Further, another advantage/feature is the apparatus having the encoder as described above, wherein the encoder performs a mode decision for the multi-prediction picture to select a mode with a minimal distortion measure from among a single predictive mode, a direct predictive mode, a bi-predictive mode using the motion vectors for the two or more reference pictures respectively calculated using single prediction, at least one bi-predictive mode using a refined motion vector for one of the two or more reference pictures and a stationary motion vector, and a bi-predictive mode using a respective refined motion vector for each of the two or more reference pictures, wherein the motion vectors for each of the two or more reference pictures are respectively calculated based upon the motion vectors for remaining ones of the two or more reference pictures being separately considered as stationary. Further, another advantage/feature is the apparatus having the encoder that performs the mode decision as described above, wherein the encoder further selects the mode with the minimal distortion measure from among at least one bi-predictive mode using the motion vector for one of the two or more reference pictures and the refined motion vector for one of the two or more reference pictures, and at least one combination including at least one direct motion vector.

Also, another advantage/feature is the apparatus having the encoder as described above, wherein the encoder predicts a respective motion vector for each of the two or more reference pictures by considering only one of the two or more reference pictures as being stationary compared to the multi-prediction picture. Additionally, another advantage/feature is the apparatus having the encoder that predicts the respective motion vector for each of the two or more reference pictures by considering only one of the two or more reference pictures as being stationary compared to the multi-prediction picture as described above, wherein the encoder predicts the respective motion vector for each of the two or more reference pictures by selecting a respective weight there for. Moreover, another advantage/feature is the apparatus having the encoder that predicts the respective motion vector for each of the two or more reference pictures by considering only one of the two or more reference pictures as being stationary compared to the multi-prediction picture as described above, wherein the only one of the two or more reference pictures is selected based on at least one of a particular reference list to which the only one of the two or more reference pictures corresponds, temporal closeness, greatest similarity to the multi-prediction picture.

Further, another advantage/feature is the apparatus having the encoder as described above, wherein the encoder performs a mode decision for the multi-prediction picture to select a mode with a minimal distortion measure from among a single predictive mode, a direct predictive mode, a bi-predictive mode using the motion vectors for the two or more reference pictures respectively calculated using single prediction, a bi-predictive mode using a stationary motion vector and a refined motion vector, wherein a respective one of the motion vectors for only one of the two or more reference pictures is calculated based upon a stationary motion vector being used for remaining ones of the two or more reference pictures. Also, another advantage/feature is the apparatus having the encoder that performs the mode decision as described above, wherein the encoder further selects the mode with the minimal distortion measure from among at least one bi-predictive mode using one of the motion vectors from one of the two or more reference pictures and the refined motion vector, and at least one combination of a direction motion vector and the motion vector calculated according to the distortion measure.

Additionally, another advantage/feature is the apparatus having the encoder as described above, wherein the encoder jointly computes the motion vectors for the two or more reference pictures based on the two or more reference pictures having identical motion with respect to the multi-prediction picture to be encoded. Moreover, another advantage/feature is the apparatus having the encoder that jointly computes the motion vectors for the two or more reference pictures as described above, wherein the encoder jointly computes the motion vectors for the two or more reference pictures by selecting a respective weight there for.

Further, another advantage/feature is the apparatus having the encoder as described above, wherein the encoder performs a mode decision for the multi-prediction picture to select a mode with a minimal distortion measure from among a single predictive mode, a direct predictive mode, a bi-predictive mode using the motion vectors for the two or more reference pictures respectively calculated using single prediction, and a bi-predictive mode using a respective refined motion vector for each of the two or more reference pictures, and a prediction mode using a motion vector for a combination of the two or more reference pictures calculated by considering the motion vectors for the two or more reference pictures to be identical. Additionally, another advantage/feature is the apparatus having the encoder that performs the mode decision as described above, wherein the encoder further selects the mode with the minimal distortion measure from among at least one bi-predictive mode using one of the motion vectors from one of the two or more reference pictures and the motion vector calculated by considering the motion vectors for the two or more reference pictures to be identical, and at least one combination of a direct motion vector and the motion vector calculated by considering the motion vectors for the two or more reference pictures to be identical.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding a multi-prediction picture from a combination of two or more reference pictures by respectively predicting a motion vector for a particular one of the two or more reference pictures in a motion estimation process while initializing motion vectors for remaining ones of the two or more reference pictures to a predefined value for use by the motion estimation process,
wherein the predefined value, to which the motion vectors for the remaining ones of the two or more reference pictures are initialized, is constrained to a value representative of the remaining ones of the two or more reference pictures being stationary, and wherein said encoder jointly computes the motion vectors for the two or more reference pictures based on the two or more reference pictures having identical motion with respect to the multi-prediction picture to be encoded.

2. The apparatus of claim 1, wherein said encoder jointly computes the motion vectors for the two or more reference pictures by selecting a respective weight there for.

3. A method, comprising:
encoding a multi-prediction picture from a combination of two or more reference pictures by respectively predicting a motion vector for a particular one of the two or more reference pictures in a motion estimation process while initializing motion vectors for remaining ones of the two or more reference pictures to a predefined value for use by the motion estimation process,
wherein the predefined value, to which the motion vectors for the remaining ones of the two or more reference pictures are initialized, is constrained to a value representative of the remaining ones of the two or more reference pictures being stationary, and wherein said encoding jointly computes the motion vectors for the two or more reference pictures based on the two or more reference pictures having identical motion with respect to the multi-prediction picture to be encoded.

4. The method of claim 3, wherein said encoding jointly computes the motion vectors for the two or more reference pictures by selecting a respective weight there for.

5. The apparatus of claim 1, wherein said encoder estimates the motion vectors for the two or more reference pictures based on weights used for the two or more reference pictures from a previous weight estimation process.

6. The method of claim 3, wherein said encoding estimates the motion vectors for the two or more reference pictures based on weights used for the two or more reference pictures from a previous weight estimation process.

7. The apparatus of claim 1, wherein the particular one of the two or more reference pictures has a highest distortion compared to the multi-prediction picture from among all of the two or more reference pictures.

8. The method of claim 3, wherein the particular one of the two or more reference pictures has a highest distortion compared to the multi-prediction picture from among all of the two or more reference pictures.

* * * * *